US007536006B2

(12) United States Patent
Patel et al.

(10) Patent No.: US 7,536,006 B2
(45) Date of Patent: May 19, 2009

(54) METHOD AND SYSTEM FOR NEAR-END DETECTION

(75) Inventors: Anil N. Patel, Coral Springs, FL (US); Satish K. Sreenivas Rao, Bangalore (IN); Krishna Kishore A., Nellore (IN); Charan M. N., Bangalore (IN)

(73) Assignee: Motorola, Inc., Schaumburg, IL (US)

( * ) Notice: Subject to any disclaimer, the term of this patent is extended or adjusted under 35 U.S.C. 154(b) by 318 days.

(21) Appl. No.: 11/459,240

(22) Filed: Jul. 21, 2006

(65) Prior Publication Data

US 2008/0019539 A1 Jan. 24, 2008

(51) Int. Cl.
*H04M 9/08* (2006.01)

(52) U.S. Cl. ................................................. 379/406.03

(58) Field of Classification Search ............ 379/406.08, 379/406.03

See application file for complete search history.

(56) References Cited

U.S. PATENT DOCUMENTS

2004/0240664 A1* 12/2004 Freed .................... 379/406.01
2005/0129226 A1 6/2005 Piket et al.

* cited by examiner

*Primary Examiner*—Alexander Jamal

(57) ABSTRACT

A system (200) and method (400) for near-end detection of voice (107) in speakerphone mode is provided. The method can include determining (402) a convergence of an adaptive filter (220), determining (404) a dissimilarity between an autocorrelation (311) of an echo estimate (244) and an autocorrelation (312) of a microphone signal (243) if the adaptive filter has converged, computing (406) a weighting factor (279) based on the dissimilarity, applying the weighting factor to a voice activity level (281) to produce a weighted voice activity level (283), comparing (410) the weighted voice activity level to a constant threshold, and performing (412) a muting operation in accordance with the comparing for providing half-duplex communication.

20 Claims, 6 Drawing Sheets

200

200

$z(n) = u(n) + y(n) + v(n)$

METHOD AND SYSTEM FOR NEAR-END DETECTION

BACKGROUND OF THE INVENTION

1. Field of the Invention

This invention relates in general to the processing of acoustic signals and more particularly, to processing of acoustic signals in relation to signal suppression and the configuration of components based on the acoustic signals.

2. Description of the Related Art

The use of portable electronic devices has risen in recent years. Cellular telephones, in particular, have become very popular with the public. The primary purpose of cellular phones is for voice communication. Many cell phones are equipped with a high-audio speaker that allows a user to engage in a cell phone conversation with a caller at a handheld distance without having to hold the phone next to the user's ear. This process is commonly referred to as speakerphone mode. Generally, during this speakerphone mode, the volume level of the speaker output is increased and the microphone sensitivity is raised to increase the voice loudness of the caller. The amplification of the speaker output and increased gain sensitivity of the microphone, however, can cause a feedback condition. In particular, the speaker output that is played to the user can reverberate in the environment in which the phone resides and may feed back as an echo into the user microphone. The caller may hear this feedback as an echo of his or her voice, which can be annoying. For this reason, echo suppressors are routinely employed to remove the echo from the receiving handset to prevent the caller from hearing his or her own voice at the calling handset.

Echo suppressors, however, cannot completely remove the echo in Speakerphone mode because they have difficulty modeling the acoustic path due to mechanical and environmental non-linearities. Moreover, an echo suppressor can become confused when the user of the receiving unit talks at the same time the caller's voice is being played out the speakerphone. This scenario is commonly referred to as a double-talk condition, which produces an acoustic signal that includes the output audio from the speaker (speaker output) and the user's voice, both of which are captured by a microphone of the user's handset. The echo suppressor cannot completely attenuate the echo of the speaker output due to the voice activity of the double-talk condition.

Voice activity detectors (VADs) are routinely employed to determine when voice is present on a communication channel for facilitating the sending of voice. The VAD can save bandwidth since voice is transmitted only when voice is present. The VAD relies on a decision that determines whether voice is present or not. In a half-duplex system, the VAD may only allow one user to speak at a time. During the occurrence of double-talk, the voice activity in the speaker output may contend with the voice activity of the user. A user may want to break into the conversation while the caller is speaking, without having to wait for the caller to finish talking; this is termed near-end break-in. That is, the user wants to say something at that moment but may be unable because of the VAD's inability to detect near-end voice during the double-talk condition. The performance of the VAD is also highly dependent on the volume level of the output speech.

SUMMARY OF THE INVENTION

Broadly stated, embodiments of the present invention concern a system for enhancing near-end detection of voice during speakerphone operations. The system and method can include one or more configurations for soft muting during high-volume speakerphone operations. The method can include determining a convergence of an adaptive filter, determining a dissimilarity between normalized autocorrelations of an echo estimate and microphone signal if the adaptive filter has converged, computing a weighting factor based on the dissimilarity, applying the weighting factor to a voice activity level to produce a weighted voice activity level, comparing the weighted voice activity level to a constant threshold, and performing a muting operation in accordance with the comparing. For example, a soft mute can be performed on an error signal if the weighted voice activity level is less than the constant threshold, and a soft mute can be performed on a far-end signal if the weighted voice activity level is at least greater than the constant threshold for suppressing acoustic coupling between the loudspeaker and the microphone. The dissimilarity indicates a presence of a near-end signal in the error signal.

Embodiments of the invention also include determining a constant threshold for providing consistent near-end detection across multiple volume steps. The constant threshold can be generated in view of the weighting factor, energy level, and a voicing mode. In particular, a near-end detection performance can be enhanced for low voice activity levels by weighting the voice activity level.

Embodiments of the invention also concern a method for near-end detection of voice suitable for use in speakerphone operations. The method can include estimating an echo of an acoustic output signal by means of an adaptive filter operating on a far-end signal and a microphone signal, suppressing the acoustic output signal in the microphone signal in view of the echo for producing an error signal, determining a filter state of the adaptive filter, computing a weighting factor in view of the filter state, estimating a voice activity level in the error signal, applying the weighting factor to the voice activity level to produce a weighted voice activity level, and performing a muting operation on the error signal if the weighted voice activity level is less than a constant threshold, or performing a muting operation on the far-end signal if the weighted voice activity level is at least greater than the constant threshold for suppressing acoustic coupling between the loudspeaker and the microphone.

Embodiments of the invention also concern a system for near-end detection suitable for use in speakerphone operations. The system can include a loudspeaker for playing a far-end signal to produce an acoustic output signal, a microphone for capturing the acoustic output signal and a near-end acoustic signal to produce a microphone signal, an echo suppressor for estimating an echo of the acoustic output signal and producing an error signal by means of an adaptive filter operating on the far-end signal and the microphone signal for suppressing acoustic coupling between the loudspeaker and the microphone, and a logic unit for detecting the near-end acoustic signal and performing a muting operation on the error signal if a weighted voice activity level is less than a constant threshold, and performing a muting operation on the far-end signal if a weighted voice activity level is at least greater than the constant threshold.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

Figure 1:
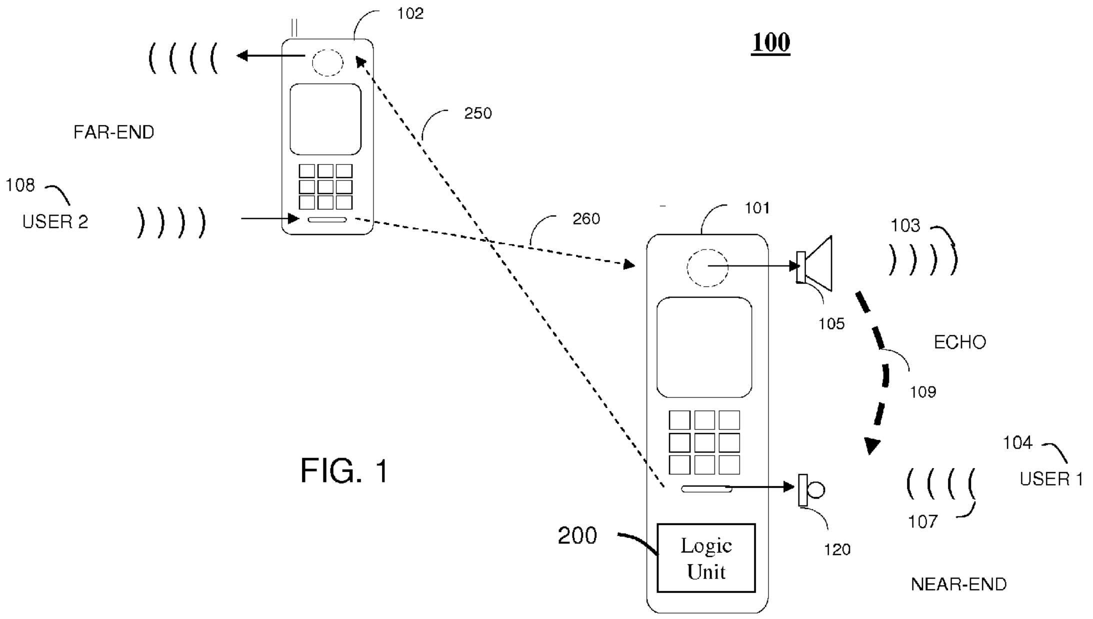
FIG. 1 depicts a half-duplex speakerphone system in accordance with an embodiment of the inventive arrangements.

While the specification concludes with claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "suppressing" can be defined as reducing or removing, either partially or completely.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. The term "near-end" is defined as a reference to the instant location of the device. The term "far-end" is defined as a reference to an afar location with reference to a location device. The term "break-in" is defined as attempting, successfully or not, to inject audio in a communication dialogue at near end. The term "voice activity" is defined as an indication that one or more characteristics of a voice for detecting the presence of the voice are present. The term "echo" is defined as a reverberation of the output of a speaker in the environment, or a direct acoustic path of audio emanating from a speaker to a microphone. The term "mute" is defined as completely or partially suppressing an audio signal level. The term "soft mute" is defined as a software mute that completely or partially suppresses an audio signal level. The term "weighting" is defined as a multiplicative scaling of a value. The term "dissimilarity" is defined as a measure of distortion between two signals. The term "sub-frame" is defined as a portion of a frame. The term "smoothing" is defined as a time-based weighted averaging. The terms "autocorrelation" and "normalized autocorrelation" in this context are same and used interchangeably.

The present invention concerns a logic unit and method for operating the logic unit for enhancing near-end voice detection during a double-talk condition in a half-duplex speakerphone system. In particular, the logic unit can include a switch unit that determines whether near-end voice is present in a microphone signal by applying a weighting factor to a voice activity level. The weighted voice activity level can be compared to a constant threshold to configure a muting operation. For example, when the weighted voice activity level exceeds the threshold, near-end voice is considered present. In this case, a far-end signal is muted and a microphone signal containing the near-end voice is connected. When the weighted voice activity level does not exceed the threshold, near-end voice is considered not present. In this case echo is considered present, and the microphone signal containing the echo is muted, while the far-end signal is connected.

In particular, the weighting factor provides for a constant thresholding operation to achieve consistent near-end detection performance over multiple volume steps. The constant threshold is advantageous in that a dynamic time varying threshold is not required. Accordingly, changes in the speakerphone output volume level do not adversely affect near-end detection performance. In effect, the weighting factor normalizes the voice activity level to account for variations in loudspeaker volume level such that consistent near-end voice activity detection performance is maintained.

The weighting factor can be determined by comparing an output of an adaptive filter and a microphone signal. The comparing can include measuring a dissimilarity between an autocorrelation of an echo estimate and an autocorrelation of a microphone signal to produce the weighting factor. The dissimilarity can also be measured between a smoothed envelope of a first autocorrelation and a smoothed envelope of a second autocorrelation. The dissimilarity provides an indication that two separate signals may be present in the microphone signal. The measure of dissimilarity is included as a scaling factor to one or more voice activity levels to produce the weighted voice activity level. Accordingly, the muting operation for half-duplex operations can be configured by comparing the weighted voice activity level to the constant threshold. Furthermore, the calculation of the dissimilarity can occur when the adaptive filter has converged. A convergence of the adaptive filter can be determined by evaluating a change in one or more adaptive filter coefficients.

BRIEF DESCRIPTION OF THE DRAWINGS

Referring to FIG. 1, a half-duplex speakerphone system 100 is shown. The system 100 can include a mobile device 101 at a near-end and a mobile device 102 at a far-end. Near-end refers to the instant mobile device 101 of the user 1 (104), and the far-end refers to the mobile device 102 of the user 2 (108). During half-duplex speakerphone mode, user 104 can speak 107 into the microphone 120 of the mobile device 101 and the processed voice data can be communicated 250 to mobile device 102 for play-out of the speaker to user 108. When user 104 has completed speaking, user 108 can speak into the mobile device 102 and the processed voice data can be communicated 260 to mobile device 101 for play-out of the speaker 105 to user 104.

When the mobile device 101 is playing audio out of the speaker 105 and producing an acoustic output 103, the microphone 120 may capture an echo 109 of the acoustic output 103. The echo 109 can be a result of reverberation in the environment. The echo can also be a direct path of the acoustic output from the loudspeaker 105 to the microphone 120. That is, the echo 109 couples the acoustic output 103 to the microphone 120. If the loudspeaker volume of the mobile device 101 is sufficiently high, the microphone 120 will likely capture an echo 109 of the acoustic output 103. In this case, the far-end user 108 will hear an echo of their voice which can be annoying. Accordingly, the mobile device 101 can include a logic unit 200 for determining a transmit and receive configuration for the communication channel 250 and the communication channel 260 for suppressing the echo 109.

Figure 2:
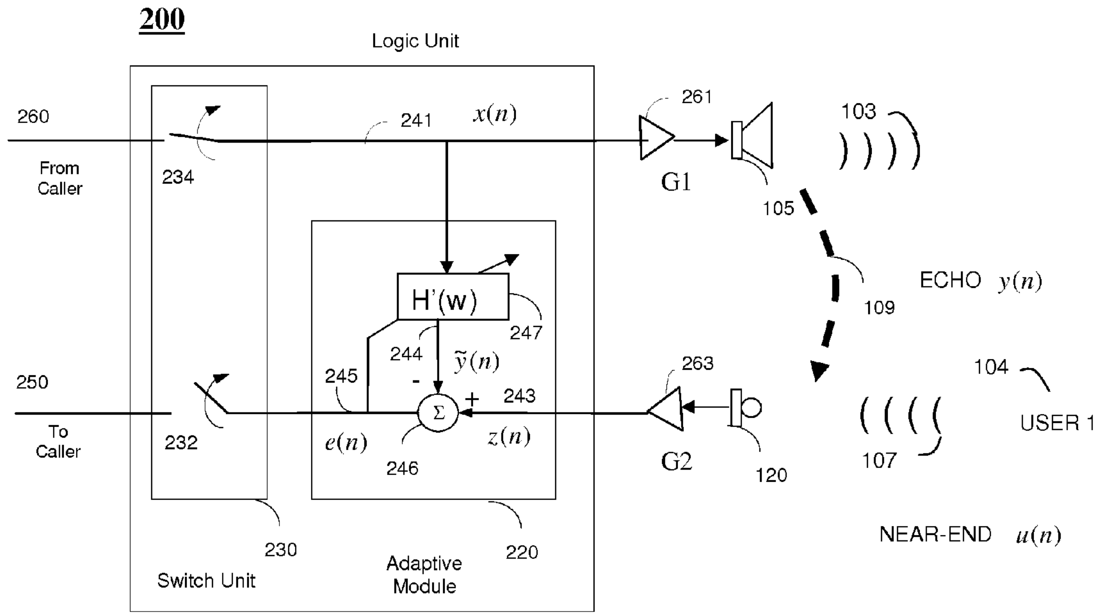
FIG. 2 is a schematic of an echo suppressor for half-duplex communication in accordance with an embodiment of the inventive arrangements.

Referring to FIG. 2, a schematic of the logic unit 200 for half-duplex communication is shown. In particular, the logic unit 200 can include an adaptive module 220 and a switching unit 230. The adaptive module 220 can be a Least Mean Squares (LMS) or Normalized Least Mean Squares (NLMS) filter as is known in the art for modeling the echo 109 path to produce an echo estimate ỹ(n) 244. The adaptive module 220 can then suppress the actual received echo y(n) 109 in the microphone signal z(n) 243 by removing the echo estimate ỹ(n) 244 from the microphone signal 243. Notably, z(n)=u(n)+y(n)+v(n), where u(n) is the user 104 voice, y(n) is the echo, and v(n) is noise, if present. The adaptive module 220 is also known in the art as an echo-suppressor. The adaptive module 220 can provide an input e(n) 245 to the switch unit 230, which is also the error signal e(n) 245 of the adaptive module 220. Briefly, e(n) 245 is used to update the filter H(w) 247 to model the echo 109 path. Accordingly, e(n) 245 closely approximates the user's 104 voice signal u(n) 107 when the adaptive module 220 accurately models the echo 109 path. The switch unit 230 can select a transmit and send configuration for the switches 232 and 234 based on a voice activity level associated with e(n) 245. Notably, the logic unit 220 can also be contained in the far-end mobile device 102 to enable half-duplex communication.

The logic unit 200 can be implemented in a processor, such as one or more microprocessors, microcontrollers, digital signal processors (DSPs), combinations thereof or such other devices known to those having ordinary skill in the art, that is in communication with one or more associated memory devices, such as random access memory (RAM), dynamic random access memory (DRAM), and/or read only memory (ROM) or equivalents thereof, that store data and programs that may be executed by the processor. The logic unit 200 can be contained within a cell phone, a personal digital assistant, or any other suitable audio communication device.

In the speakerphone mode of operation, the gain G1 261 for the line-signal x(n) 241 is generally dependent upon volume steps which are selected by the user 104. For example, the user 104 can increase the gain G1 261 for increasing a volume of the acoustic output 103. Similarly, the microphone signal 120 to the adaptive unit 220 can be amplified by a gain G2 263 to increase a dynamic range of the microphone signal 243. The gain G2 263 can be a hardware gain that amplifies the near-end voice u(n) 107 from the user 104. This is due in part because the distance between the user and the microphone may be considerably far. The gain G2 263 may be a constant gain that is chosen such that the voice 107 is not clipped by the microphone 120, or an analog to digital converter (not shown).

In practice, the adaptive module 220 can suppress the echo 109 to avoid the user 108 hearing an echo. However, the echo 109 can increase with each volume step G1 261, and the adaptive module 220 alone may not be generally sufficient to suppress the echo 109 at the higher volume steps. Accordingly, the switch unit 230 provides for intelligent soft muting on the transmit channel 250 at times when the echo is only partially suppressed. Soft muting is a form of software controlled suppression that can completely or partially suppress a signal. The switch unit 230 also ensures that a soft mute is released along the transmit channel when near-end voice is detected. This is termed as the near end break-in or near end detection. In response to the soft mute release on the transmit channel 250, the switch unit 230 attenuates the line signal 241 representing the far-end in the receive channel 260.

For example, the switch unit 230 can close the switch 232 to transmit the signal 245 representing the near-end voice 107 to the mobile device 102 over the communication channel 250. The switch unit 230 can concurrently open the switch 234 to prevent the line signal 241 representing the far-end voice from being played out the loudspeaker 105. Understandably, this configuration is selected when the logic unit 200 detects the near-end voice 107 for transmitting the near-end voice 107 to mobile device 102. An open switch configuration 234 prevents the far-end voice 108 from playing out the speaker 105 and mixing with the near-end voice 107.

In another configuration, the switch unit 230 can open the switch 232 to prevent the signal 245 from being transmitted to the mobile device 102 over the communication channel 250. The switch unit 230 can concurrently close the switch 234 to allow the far-end line signal 241 to be played out the loudspeaker 105. Understandably, this configuration is selected when the logic unit 200 detects echo 109 for preventing the echo 109 from being transmitted to the mobile device 102. This can mitigate a feedback condition. The switches 234 and 232 are in generally opposite states in order to provide half-duplex communication. That is, when switch 232 closes, switch 234 is open. When switch 234 closes, switch 232 opens. A time delay may exist between the closing and opening of the switches, and the switches may or may not operate simultaneously with one another. The switches may also be software defined or controlled, and are not limited to hardware physical switches.

In one arrangement, the adaptive module 220 can model a transformation between the line signal x(n) 241 representing the far-end voice and the microphone signal z(n) 243. For example, the adaptive filter 220 can employ the Normalized Least Mean Squares (NLMS) algorithm for estimating a linear model of the echo 109 path. The adaptive module 220 can generate a filter 247 (H(w)) that represents a linear transformation between the far-end line signal x(n) 241 and the microphone signal z(n) 243. The filter 247 can account for spectral magnitude differences and phase differences between the two inputs 241 and 243. The adaptive module 220 can process the line signal x(n) 241 with the filter response 247 to produce the echo estimate ỹ(n) 244. The adaptive module 220 can include an operator 246 that can subtract the echo estimate ỹ(n) 244 from the microphone input z(n) 243 to produce the error signal e(n) 245. Moreover, the adaptive module 220 can employ the error signal e(n) 245 as feedback to update the measured transformation between the two inputs x(n) 241 and z(n) 243.

As noted earlier, the adaptive module 220 can provide the e(n) 245 as input to the switch unit 230. The switch unit 230 can compare e(n) 245 with a threshold, which can be stored in the VAD 230 or some other suitable component. Based on this comparison and as will be explained below, the switch unit 230 may selectively control the output or input of several audio-based components of the communication device 140. As part of this control, various configurations of the switch unit 230 may be set. For example, the logic unit 230 can evaluate e(n) 245 to enable or disable the transmit line 250 and the receive line 260 through the switches 232 and 234. As an example, the switch unit 230 can connect the send line 250 via the switch 232 and can concurrently disconnect the receive line 260 via the switch 234 if the evaluated error signal 245 exceeds a threshold. This scenario may occur if a user is speaking into the communication device 140. Conversely, the switch unit 230 can disconnect the transmit line 250 via the switch 232 and can concurrently connect the receive line 260 via the switch 234 if the error does not exceed the threshold. This situation may occur when the user 108 of mobile device 102 is speaking to user 104 of the mobile device 101 and the caller's voice is being played out of the speaker 105.

Figure 3:
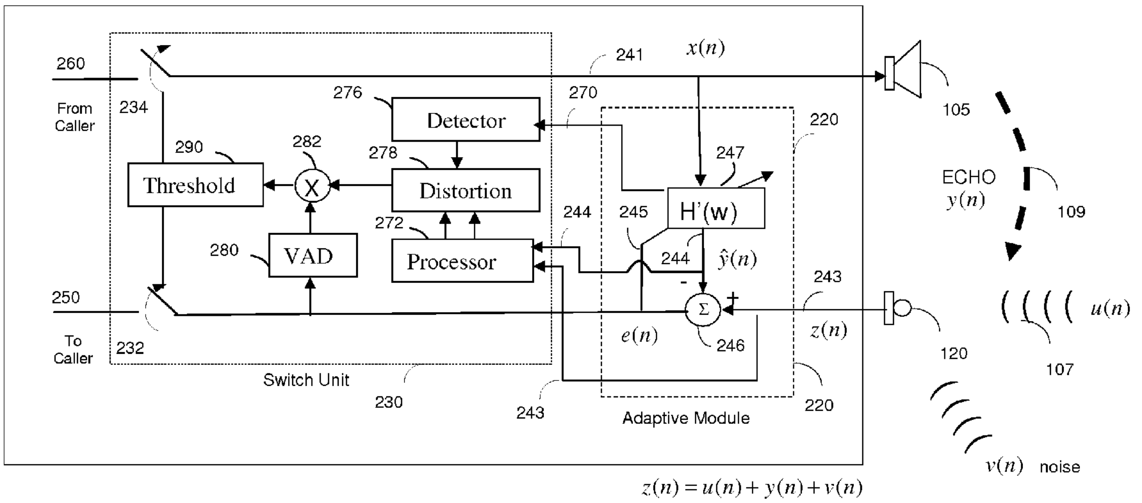
FIG. 3 is a schematic of the logic unit of the echo suppressor of FIG. 2 in accordance with an embodiment of the inventive arrangements.

Briefly referring to FIG. 3, a more detailed schematic of the logic unit 200 is shown. The switch unit 230 can include a processor 272 for determining an autocorrelation of the echo estimate ỹ(n) 244 and an autocorrelation of the microphone signal z(n) 243, a distortion unit 278 for identifying a dissimilarity between the two autocorrelations, and a detector 276 for determining when the adaptive filter module 220 has converged. The processor 272 can operate on a frame basis or a sub-frame basis. Briefly, the distortion unit 278 measures a dissimilarity between an autocorrelation of the echo estimate ỹ(n) 244 and an autocorrelation of the microphone signal z(n) 243 when the adaptive filter module 220 has converged. The switch unit 230 can further include a voice activity detector (VAD) 280 for estimating a voice activity level in the error signal e(n) 245, a weighting operator 282 for applying a weighting factor to the voice activity level, and a threshold unit 290 for comparing the weighted voice activity level to a constant threshold specified by the threshold unit 290.

Briefly, the VAD 280 can estimate an energy level, r0, and a voicing mode, vm, of the error signal e(n) 245. The energy level, r0, provides a measure of energy. For example, a voice signal or noise may be present when an energy of e(n) 245 is very high, and a voice signal or noise may be determined absent when an energy of e(n) 245 is low. For instance, during silence, the energy is small signifying the absence of voice or noise. The VAD 280 can also assign four voicing mode decisions to the error signal 245, but is not limited to four. A vm=0 may signify no voicing content whereas a vm=3 may signify high voicing content. In one arrangement, the level of voicing may be determined based on a periodicity of the error signal e(n) 245. For example, vowel regions of voice are associated with high periodicity.

The switch unit 230 can determine a soft mute configuration based on the energy level, r0, and the voicing mode, vm, produced by the VAD 280. In general, the threshold unit 290 classifies a presence of near-end voice when vm=2 or vm=3. However, when vm=1, the threshold unit 290 considers an absence of near-end voice u(n) 107, similar to a case when vm=0. That is, the threshold unit 290 states that no near-end voice is present in the error signal 245 when vm=1. Consequently, if the near-end voice u(n) 107 is present with echo 109, and the VAD 280 assigns a voice level classification of vm=1. The threshold unit 290 will not indicate the presence of voice. Accordingly, voice may be present though the threshold unit 290 would not consider vm=1 corresponding to near-end voice activity. Consequently, embodiments of the invention provide the weighting operator 282 to introduce a weighting factor that is produced by the distortion module 278 that enhances a detection of near-end voice when vm=1. Moreover, the logic unit 200 retains near-end detection performance under pure echo conditions when e(n) has decisions vm=0,1 in the absence of u(n).

Figure 4:
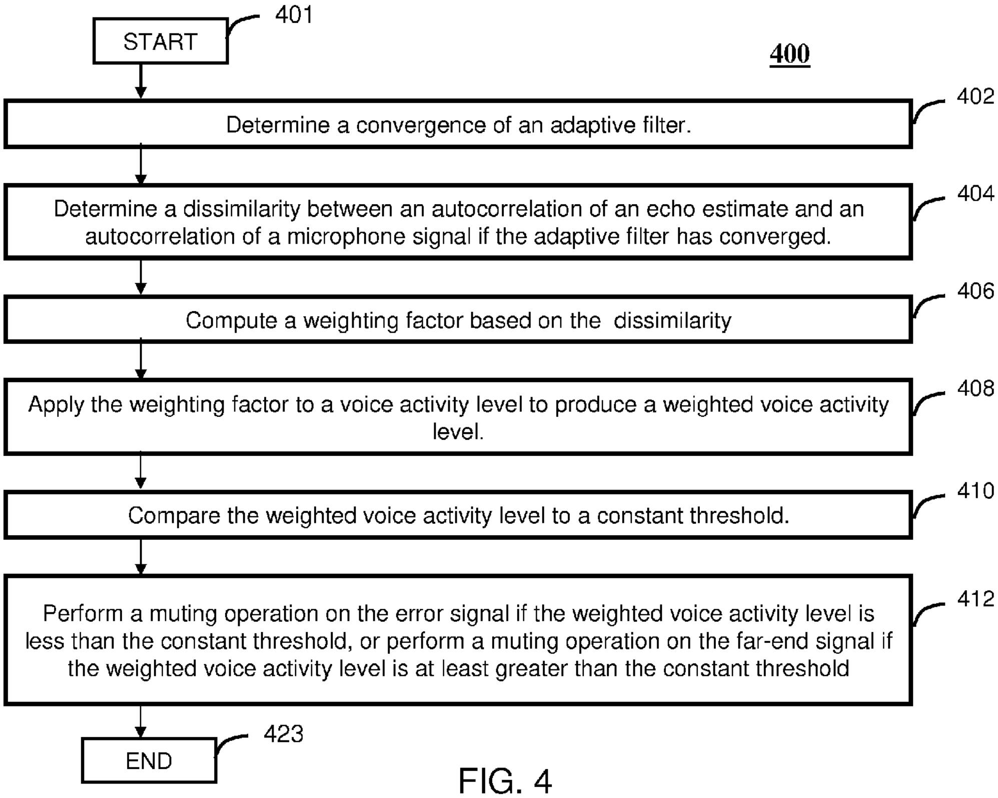
FIG. 4 is a method for near-end detection in accordance with an embodiment of the inventive arrangements.

Referring to FIG. 4, a method 400 for soft muting suitable for use in speakerphone operations is shown. In particular, the method 400 can provide enhanced near end detection of u(n) 107 during high-volume speakerphone applications even though the VAD 280 has assigned a vm=1 decision to e(n) 245 (See FIG. 3). The method 400 can be practiced with more or less than the number of steps shown. To describe the method 400, reference will be made to FIGS. 3, 5, and 6 although it is understood that the method 400 can be implemented in any other suitable device or system using other suitable components. Moreover, the method 400 is not limited to the order in which the steps are listed in the method 400. In addition, the method 400 can contain a greater or a fewer number of steps than those shown in FIG. 4.

At step 401, the method 400 can start. At step 402, a convergence of an adaptive filter can be determined. For example, referring to FIG. 3, the detector 276 determines when the adaptive module 220 has converged. Various methods are available to detect the state when an LMS or NLMS algorithm of the adaptive filter module 220 converges. In one arrangement, the detector 276 evaluates a change of at least one adaptive filter coefficient of ((H(w) 247) to determine whether the adaptive filter has converged. In general, convergence occurs when a steady state of the adaptive filter ((H(w) 247) is reached. This is generally associated with a leveling off of an error performance. That is, the performance of the adaptive module 220 for modeling the echo 109 path is relatively constant. The change of adaptive filter coefficients can be used to trigger a computation of normalized autocorrelations. The triggering can be achieved by comparing a sum of differences of coefficients from a current frame to a previous frame against a threshold.

$$\mathrm{Sum} = \sum_{i=0}^{(Taps-1)} |h(i, k) - h(i, k-1)|$$

$k$ = current frame

If (Sum < $T1$)

Call $AutoCr(\ )$;

The occurrence of double-talk can be detected by the NLMS algorithm of the adaptive module 220. If double-talk is detected, adaptation of the weights is discontinued thereby not allowing the filter to diverge. Once the filter converges, the adaptation varies only slightly across the frames. Accordingly, the threshold T1 can be set to a minimum value. The function AutoCr ( ) computes the normalized autocorrelations of ŷ(n) 244 and z(n) 243. The number of autocorrelation lags can be selectable, for example by a programmer of the method 400. The number of lags is generally restricted to a minimum of a quarter the frame length of ŷ(n) or z(n). It should also be noted that the AutoCr ( ) function can be called at shorter integral frame lengths than the overall frame length. For example, if the logic unit 200 operates at 30 ms frame length, the AutoCr ( ) function can be called at shorter integral frame lengths, such as 10 ms. Henceforth, embodiments of the invention assume the AutoCr ( ) function is called every 10 ms.

At step 404, a dissimilarity between an autocorrelation of an echo estimate and an autocorrelation of a microphone signal can be determined if the adaptive filter has converged.

That is, the autocorrelations are to be computed after the NLMS has converged. In particular, a higher dissimilarity indicates a presence of the near-end acoustic signal, u(n) 107, in the error signal, e(n) 245. The normalized autocorrelation of the echo estimate ŷ(n) 244 and the normalized autocorrelation of the microphone signal z(n) 243 can be envelope tracked for all autocorrelation lags by the following equation $$Env(j)(i)=NormAutoCr(j)(i)*A1+(1-A1)*Env(j)(i-1)$$

for $i$=2, Lags+1 for $j$=1,2 where Env (1) ($i$) is the envelope of $\hat{y}(n)$

Env (2) ($i$) is the envelope of $z(n)$

Norm AutoCr ($j$) ($i$) is the normalized autocorrelation

A1 is a rolling factor

Env ($j$) (1)=1, the initial value

The dissimilarity amongst the envelopes can be obtained by, $$Sum=\sum_{i=1}^{(Lags+1)}|Env(1)(i)-Env(2)(i)|$$

The 'Sum' indicates the magnitude of dissimilarity amongst ŷ(n) 244 and z(n) 243.

Figure 5:
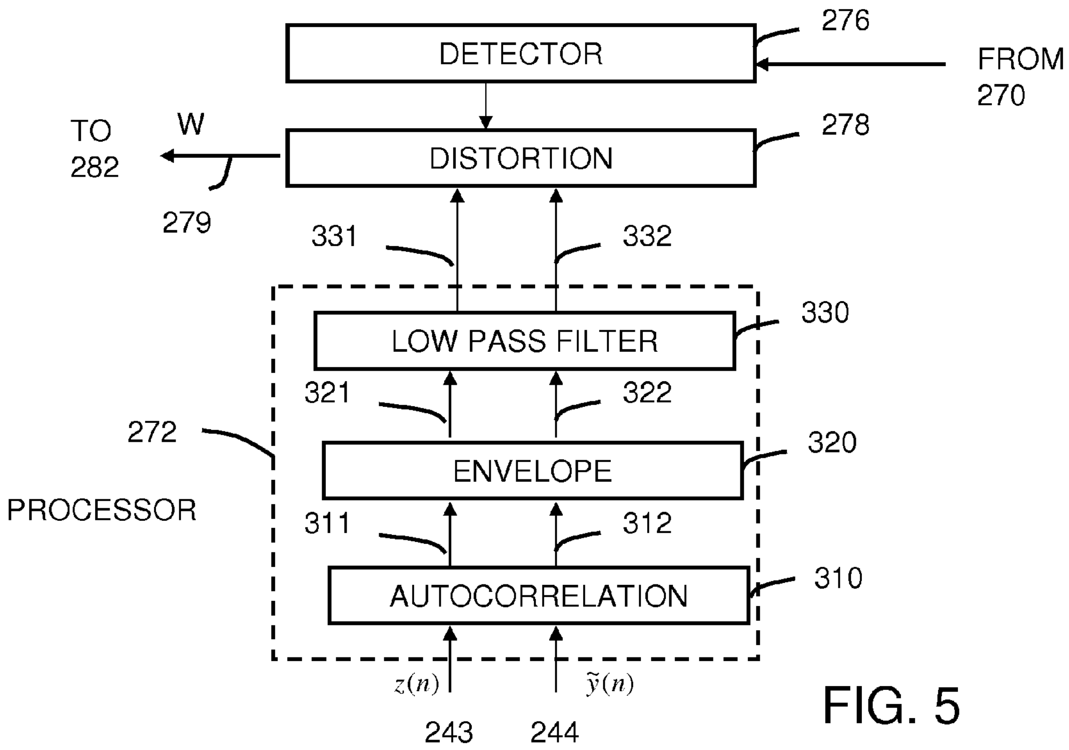
FIG. 5 is a schematic of the processor of the logic unit of FIG. 2 in accordance with an embodiment of the inventive arrangements.
Figure 6:
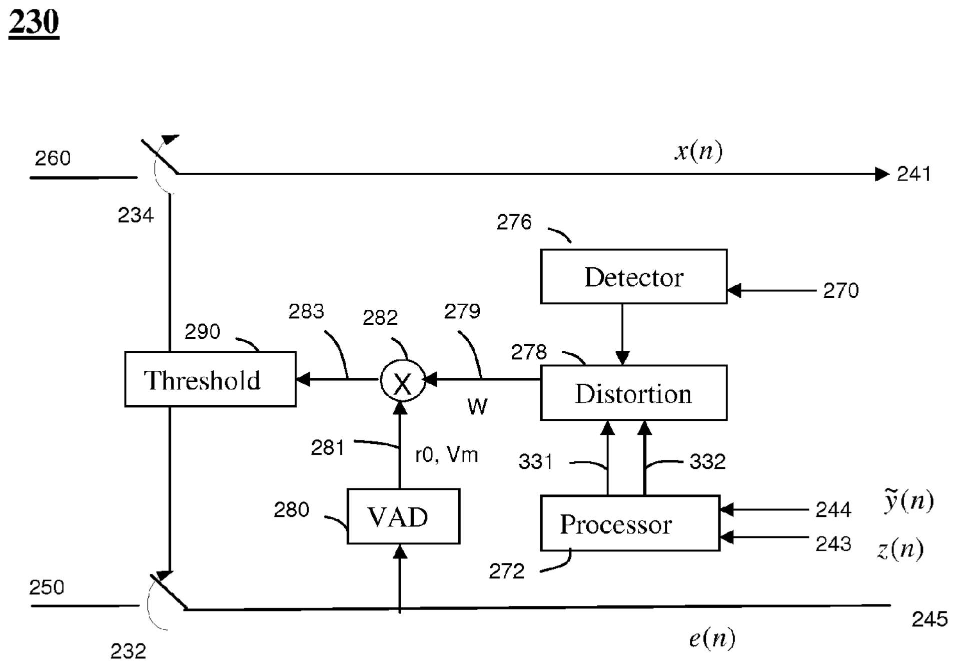
FIG. 6 is a schematic of a switch unit in accordance with an embodiment of the inventive arrangements.

Referring to FIG. 5 a more detailed schematic of the processor 272 is shown for describing the method step 404. The processor 272 can include an autocorrelation unit 310 for computing an autocorrelation 311 of the echo estimate 244 and an autocorrelation 312 of the microphone signal 243. The processor 272 can include an envelope detector 320 for estimating a first time-envelope 321 of the first autocorrelation 311 and a second time-envelope 322 of the second autocorrelation 312. The first time-envelope 321 and the second time-envelope 322 can be smoothed by the low-pass filter 330 for producing a first smoothed time envelope 331 and a second smoothed time envelope 332. Notably, the smoothed time envelope 331 corresponds to the echo estimate 244 and the second smoothed time envelope 332 corresponds to the microphone signal. The smoothed time envelopes can also be calculated on a sub-frame basis. For example, the logic unit 200 may perform muting operations on a frame rate interval, such as 30 ms, though the distortion unit 278 generates a weighting factor, W 279, on a sub-frame interval, such as 10 ms. The detector 276 determines when the adaptive module 220 converges, and the distortion unit 278 calculates a sub-frame distortion between the first time-envelope 331 and the second time-envelope 332 based on the convergence.

At step 406, a weighting factor can be computed based on the dissimilarity. For example, referring to FIG. 5, the distortion unit 278 can produce a weight factor, W 279, based on the dissimilarity between the smoothed time envelope 331 and the smoothed time envelope 332 when the adaptive module 220 has converged. As one example, the dissimilarity can be a log likelihood distortion between the first time envelope an the second time envelope. It should also be noted that the 'Sum' computed in the method step 404 is the dissimilarity between speech frames of duration 10 ms. As previously mentioned, the factor W 279 will be multiplied by the product of two voice activity level parameters generated every 30 ms by the VAD 280. Hence, the distortion unit 278 generates the factor W 279 out of 'Sum' at the end of 30 ms. Other computation of factor W 279 is an average of standard weights when 'Sum' is within the range of thresholds. The 'Sum' is expected to be very small when ŷ(n) 244 and z(n) 243 are close approximations of one another. The factor W 279 thus computed will be optimal, in a least squares sense, for the product of r0 and vm. The standard weights and the thresholds will be set to small values as described by the logic below.

```
FinalSum = 0; Flag = 0;
for i = 1, 2, 3
    if (Sum (i) < T2)
        FinalSum = FinalSum + W1;
    else if (Sum (i) < T3)
        FinalSum = FinalSum + W2;
    else if (Sum (i) < T4)
        FinalSum = FinalSum + W3;
    else if (Sum (i) < T5)
        FinalSum = FinalSum + W4;
    else if (Sum (i) ≧ T5)
        Flag = 1;
end
if (Flag ≠ 1)
    W = FinalSum ÷ 3;
else
    W = SecdCrit ( );
end
where T2 < T3 < T4 < T5 are thresholds
    W1 < W2 < W3 < W4 are standard
weights
```

As revealed in the logic above, the method 400 includes performing a weighted addition on a plurality of sub-frame distortions for producing the weighting factor, and calculating a correction factor for producing the weighting factor if the weighted addition is greater than a threshold; that is, if Flag is equal to one. The first step in SecdCrit ( ) function involves selecting the first and second maxima of 'Sum' of 3 sub frames as shown in the pseudo code below.

```
FirstMax=0; SecdMax=0; FirstMaxInd=0; SecdMaxInd=0;
for i = 1, 2, 3
    if (Sum (i) > FirstMax)
        FirstMax = Sum (i);
        FirstMaxInd = i;
        Sum (i) = 0;
    end
end
for i = 1, 2, 3
    if (Sum (i) > SecdMax)
        SecdMax = Sum (i);
        SecdMaxInd = i;
    end
end
```

If any values for 'Sum' in 3 sub frames exceeds the set threshold as mentioned above, a different criteria is adopted. Notably, three 10 ms sub-frames provide a same time scale as one 30 ms frame. During the cases of pure echo, a short surge of unexpected signal within any of the 3 sub frame limits will result in the product of W, r0 and vm sufficient enough to break in as vm may result in 1 instead of 0. With W having considerable magnitude, there is likelihood of unwanted near end break in. It is however required not to break in near end at such times. A regulation on W helps us to obviate this.

In the above mentioned scenario, the SecdMax will be sufficiently less than FirstMax since the former would be a result of pure echo sub frame and latter due to unexpected signal. With a scaling factor F1, it is possible to select either C3 or C4 to regulate W such that near end does not break in.

During the presence of near end signal u(n), either of C1 or C2 is selected. If the first and second maxima occur consecutively, the regulation on W is made less (choosing C1 wrt C2). C1, C2 can have higher factors compared to C3, C4.

The following logic is provided as pseudo code:

```
if (SecdMax ≧ FirstMax * F1)
    if ((SecdMaxInd == FirstMaxInd − 1) ||
            (SecdMaxInd == FirstMaxInd + 1))
        CorrectionFac = C1;
    else
        CorrectionFac = C2;
    end
else
    if ((SecdMaxInd == FirstMaxInd − 1) ||
            (SecdMaxInd == FirstMaxInd + 1))
        CorrectionFac = C3;
    else
        CorrectionFac = C4;
    end
end
W = ((FirstMax + SecdMax) ÷ 2) × CorrectionFac;
where F1 is the scaling factor such that 0 < F1 < 1.
    C1 > C2 > C3 > C4 are the correction factors such that C1, C2,
C3, C4 are <1.
```

As revealed above, the calculating a correction factor includes determining a first maximum of a sub-frame distortion, determining a second maximum of a sub-frame distortion, comparing the second maximum to a scaled first maximum, and assigning at least one correction factor based on the comparing. The at least one correction factor can be multiplied by an average of the first maximum and the second maximum for producing the weighting factor as shown above. Briefly referring to FIG. 5, the distortion unit 278 calculates a sub-frame distortion between the first time-envelope 331 and the second time-envelope 332 for determining the dissimilarity and generates the weighting factor based on the dissimilarity.

At step 408, the weighting factor can be applied to a voice activity level to produce a weighted voice activity level. Briefly referring to FIG. 6, a more detailed schematic of the switch unit 230 is shown for describing the method step 408. In particular, the factor W 279, the voice activity level parameters 281, and the weighted voice activity level 283 are shown. The distortion unit 278 produces the weighting factor W 279 based on a dissimilarity between the echo estimate 244 and the microphone signal 243. In practice, the weighting factor 279 can scale the voice activity levels 281 generated by the VAD 280. For example, the weighting operator 282 can multiply the voice activity level 281 by the weighting factor 279 to produce a weighted voice activity level 283. In particular, the factor W 279 can be multiplied by the product of two voice activity level parameters 281 of e(n) 245 generated by the VAD 280. That is, the factor W 279 can be multiplied with the product of r0 and vm (281) to produce the weighting voice activity level 283.

At step 410, the weighted voice activity level can be compared to a constant threshold. For example, referring to FIG. 6, the threshold unit 290 can compare the weighted voice activity level 283 to a constant threshold to determine when to open and close the switches 232 and 234, in accordance with the embodiments of the invention herein presented. It should be noted that the weighted voice activity level is less sensitive to gain variations in a volume level of the acoustic output (See G1 261 and 103 of FIG. 2). Recall, the r0 and vm (281) are computed every 30 ms due to a dependency on a frame rate of a vocoder. Accordingly, the sub-frame computations of the dissimilarity provide for a smoothed calculation of the weighting factor, W 279. The weighted voice activity level 283 can then be compared to a constant threshold that does not need to dynamically vary in accordance with changes in volume level.

At step 412, a muting operation can be performed. For example, the muting operation can be performed on a microphone signal if the weighted voice activity level is less than the constant threshold. Alternatively the muting operation can be performed on a far-end signal if the weighted voice activity level is at least greater than the constant threshold for suppressing acoustic coupling between the loudspeaker and the microphone. For example, referring to FIG. 3, the switch unit 230 may detect a near-end signal, u(n) 107 on the error signal e(n) 245, during a double-talk condition and perform a muting operation on the far-end signal x(n) 260 via switch 234 if the weighted voice activity 283 level is at least greater than the constant threshold or perform a muting operation via switch 232 on the error signal e(n) 245 if the weighted voice activity level 283 is less than a constant threshold. At step 423 the method 400 can end.

In summary, referring to FIG. 4, for illustration, the method 400 computes a normalized autocorrelation of ŷ(n) 244 and normalized autocorrelation of z(n) 243, determines a dissimilarity between a time-envelope of the computed normalized autocorrelations (331 and 332), produces a weighing factor, W 279, based on the dissimilarity, multiplies W 279 with the product of r0 and vm (281) of e(n) 245 to produce a weighted voice activity level 283, compares the weighted voice activity level 283 against a constant threshold for near end detection, and performs a soft muting operation in accordance with the comparing. Notably, the comparison of the weighted threshold 283 against the constant threshold provides for consistent near end detection rate across varying acoustic speaker output (105) volume steps. In addition, the weighted voice activity 283 provides for fast detection of near-end voice.

A brief example is presented. Referring back to FIG. 3, ŷ(n) 244 is the estimate of the echo y(n) 109. First, let us assume that the microphone signal z(n) is a result of echo y(n) alone. If the NLMS of the adaptive module 220 has converged, then ŷ(n) 244 closely approximates z(n) 243. Hence the normalized autocorrelations of ŷ(n) 244 and z(n) 243 are similar. In such a scenario, the weight factor W 279 is small. Accordingly, the overall product of W 279, r0 (281) and vm (281) will be much less than the set threshold. The threshold unit 290 will cause a soft mute of e(n) 245 along the transmit channel 250.

Next, let us assume that z(n) 243 is a result of echo y(n) 109 and near-end voice u(n) 107. If the NLMS of the adaptive module 220 has converged, then ŷ(n) 244 closely approximates only y(n) 109. Due to u(n) 107, the normalized autocorrelations of ŷ(n) and z(n) will be entirely different. This will result in W (beyond the value 1) 279 being high and hence the overall product of W 279, r0 (281) and vm (281). The threshold unit 290 received a higher weighting voice activity level to enhance near-end detection even with low voice activity levels of the VAD. That is, near-end detection is enhanced for vm=1. The same will be the situation if z(n) is a result of y(n), u(n) and v(n).

Next, let us assume that z(n) is a result of echo y(n) 109 and noise v(n). In this situation, the threshold unit 290 should not trigger near-end detection. Accordingly, if v(n) is not white (i.e. having uniform spectral content), the normalized autocorrelations of ŷ(n) and z(n) are likely different. Consequently, the distortion unit 278 produces a high value of W.

However, in such a condition, vm=0 and the weighting operator 282 will produce a 0 overall product thereby avoiding the false near end detection.

Embodiments of the invention also concern a method for generating a constant threshold for comparison against the weighted voice activity level. The selection of the constant threshold removes a dependency on the far end speech for the near end detection. For example referring to FIG. 6, the threshold unit 290 can create a constant threshold which will be compared against the weighted voice activity level 283; that is, the weighted product of r0 and vm. For example, the threshold unit 290 can produce a constant threshold for comparison against the product of W, r0 and vm. It should be noted that although the maximum weighted product of r0 and vm is 1.15 (implementation), since W can exceed the value 1, the weighted voice activity level (i.e. overall product of W, r0 and vm) will be in decimal notation format x.y (where x is the mantissa and y is the ordinate with $x \geqq 2$). In other words, the value can exceed the limit 1, which is especially true during the utterance of u(n) in e(n).

As the factor W 279 influences the product of r0 and vm (281), there will be a substantial difference in the overall multiplicative products during the cases of near-end and pure echo when considered separately. This leads to the selection of constant 'TConst' which can be set to a safe value below which the speakerphone fails to break in. However, it should be a value at least >(1.0*safelimit) since overall product is greater than 1. The value of 'safelimit' is the choice of a programmer implementing the method 400 such that safelimit >1. The safelimit is also dependent upon the performance of AutoCr ( ) at the highest volume step as there is a higher probability that z(n) will be clipped. The term clipped is defined as hard limiting which may saturate the amplitude of the signal. Accordingly, the selection of safelimit depends upon the particular phone and the respective gain lineup.

Where applicable, the present invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present invention may also be embedded in a computer program product, which comprises all the features enabling the implementation of the methods described herein and which when loaded in a computer system, is able to carry out these methods.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of soft muting suitable for use in speakerphone operations, comprising:

determining a convergence of an adaptive filter;

determining a dissimilarity between an autocorrelation of an echo estimate and an autocorrelation of a microphone signal if the adaptive filter has converged;

computing a weighting factor based on the dissimilarity;

applying the weighting factor to a voice activity level to produce a weighted voice activity level;

comparing the weighted voice activity level to a constant threshold; and performing a muting operation on an error signal if the weighted voice activity level is less than the constant threshold, and performing a muting operation on a far-end signal if the weighted voice activity level is at least greater than the constant threshold for suppressing acoustic coupling between a loudspeaker and a microphone and allowing near end to break in.

2. The method of claim 1, further comprising:

evaluating a change of at least one adaptive filter coefficient to determine whether the adaptive filter has converged.

3. The method of claim 1, further comprising:

establishing the constant threshold based on the weighting factor, an energy level, and a voicing mode.

4. The method of claim 1, further comprising evaluating a voice activity level of the error signal, and if the voice activity level is below a threshold, not applying the weighting factor to the voice activity level for retaining a voice activity detection performance when the adaptive filter has not converged without the weighting factor.

5. A method for near-end detection suitable for use in speakerphone operations, comprising:

estimating an echo of an acoustic output signal by means of an adaptive filter operating on a far-end signal and a microphone signal by computing a first autocorrelation of the echo estimate and a second autocorrelation of the microphone signal and determining a dissimilarity between the first autocorrelation and the second autocorrelation;

suppressing the acoustic output signal in the microphone signal in view of the echo for producing an error signal;

determining a filter state of the adaptive filter;

computing a weighting factor in view of the filter state based on the dissimilarity;

estimating a voice activity level in the error signal;

applying the weighting factor to the voice activity level to produce a weighted voice activity level; and performing a muting operation on the error signal if the weighted voice activity level is less than a constant threshold, and performing a muting operation on the far-end signal if the weighted voice activity level is at least greater than the constant threshold for suppressing acoustic coupling between the loudspeaker and the microphone and allowing the near end break in.

6. The method of claim 5, wherein the determining a filter state further comprises:

evaluating a change of at least one adaptive filter coefficient to determine whether the adaptive filter has converged.

7. The method of claim 5, wherein the computing a weighting further comprises:

generating the weighting factor based on the dissimilarity, wherein the dissimilarity indicates a presence of the near-end acoustic signal in the error signal.

8. The method of claim 7, wherein the estimating a voice activity level further comprises:

computing an energy level and a voicing mode of the error signal, and the applying the weighting factor further comprises:

multiplying the energy level and the voicing mode by the weighting factor for producing the weighted voice activity level.

9. The method of claim 7, further comprising:

estimating a first time-envelope of the first autocorrelation;

estimating a second time-envelope of the second autocorrelation; and calculating a distortion between the first time-envelope and the second time-envelope.

10. The method of claim 9, further comprising:

applying a low-pass filter for smoothing out the first time-envelope and the second time envelope.

11. The method of claim 9, wherein calculating a distortion further comprises:

performing a weighted addition on a plurality of sub-frame distortions for producing the weighting factor.

12. The method of claim 11, further comprising:

calculating a correction factor for producing the weighting factor if the weighted addition is greater than a threshold.

13. The method of claim 12, wherein the calculating a correction factor comprises:

determining a first maximum of a sub-frame distortion;

determining a second maximum of a sub-frame distortion;

comparing the second maximum to a scaled first maximum; and assigning at least one correction factor based on the comparing.

14. The method of claim 13, further comprising:

multiplying the at least one correction factor to an average of the first maximum and the second maximum for producing the weighting factor.

15. A system for near-end detection suitable for use in speakerphone operations, comprising:

a loudspeaker for playing a far-end signal to produce an acoustic output signal;

a microphone for capturing the acoustic output signal and a near-end acoustic signal to produce a microphone signal;

an echo suppressor for estimating an echo of the acoustic output signal to produce an echo estimate and producing an error signal by means of an adaptive filter operating on the far-end signal and the microphone signal for suppressing acoustic coupling between the loudspeaker and the microphone;

an autocorrelation unit for computing a first autocorrelation of the echo estimate and a second autocorrelation of the microphone signal;

an envelope detector for estimating a first time-envelope of the first autocorrelation and estimating a second time-envelope of the second autocorrelation; and a switch unit for detecting the near-end acoustic signal and performing a muting operation on the error signal if a weighted voice activity level is less than a constant threshold, and performing a muting operation on the far-end signal if a weighted voice activity level is at least greater than the constant threshold and allowing near end break in.

16. The system of claim 15, further comprising a voice activity detector for estimating a voice activity level in the error signal;

a weighting operator for applying a weighting factor to the voice activity level to produce the weighted voice activity level; and a threshold unit for comparing the weighted voice activity level to a constant threshold.

17. The system of claim 15, further comprising a processor comprising:

a low pass filter for smoothing out the first time-envelope and the second time-envelope.

18. The system of claim 17, further comprising a distortion unit for determining a dissimilarity between the first autocorrelation and the second autocorrelation if the adaptive filter has converged, wherein the dissimilarity indicates a presence of the near-end acoustic signal in the error signal.

19. The system of claim 18, wherein the distortion unit calculates a sub-frame distortion between the first time-envelope and the second time-envelope for determining the dissimilarity and generates the weighting factor based on the dissimilarity.

20. The system of claim 18, further comprising a detector for evaluating a change of at least one adaptive filter coefficient to determine whether the adaptive filter has converged.

* * * * *